Jan. 23, 1968  J. L. CANNELLA  3,365,580
FILM READER WITH TRANSPARENT CAPSTAN AND U-SHAPED
LIGHT CONDUCTING ROD
Filed May 7, 1964
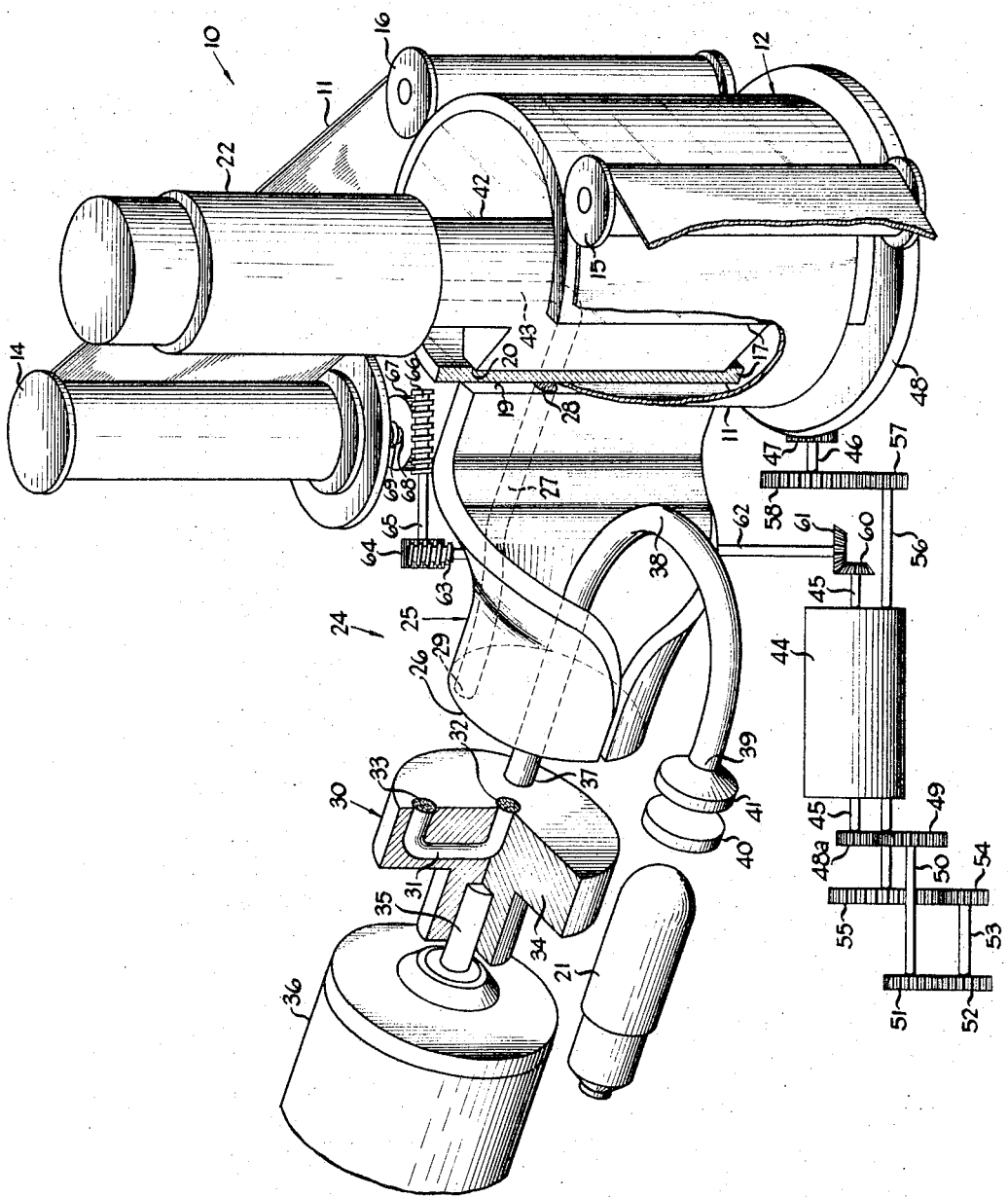
Inventor
Joseph L. Cannella
By Louis Bernat
Atty

3,365,580
FILM READER WITH TRANSPARENT CAPSTAN AND U-SHAPED LIGHT CONDUCTING ROD
Joseph L. Cannella, Melrose Park, Ill., assignor, by mesne assignments, to the United States of America as represented by the Administrator of the National Aeronautics and Space Administration
Filed May 7, 1964, Ser. No. 365,601
9 Claims. (Cl. 250—227)

This invention relates to a film reader which is simple, small in size and weight, efficient and reliable in operation and operable at high speed with high resolution capabilities, while being usable with various record mediums without damage thereto. The invention described herein was made in the performance of work under a NASA contract and is subject to the provisions of the National Aeronautics and Space Act of 1958, Public Law 85-568 (72 Stat. 426; 42 U.S.C. 2451), as amended.

Scanning systems have heretofore been provided in which a film or other record medium is passed between spaced aligned elongated or line face portions of transmission means used in transmitting radiation from a source to a detector, with scanning means being provided for restricting or concentrating the transmission to an incremental spot area movable longitudinally with respect to such face portions, to perform a transverse line scan. Important improvements have been made in such scanning systems, and particularly in the use of fiber optic elements in circle-to-line shape transducers, with the circle end of the transducer being scanned by a distributor element rotatable at high speed. With such improvements, the construction and operation of the scanning system has been simplified and it has been possible to obtain a high degree of reliability and efficiency, coupled with small size and weight.

It has been found however that such systems have had shortcomings, particularly in sometimes performing erratically and also in scratching or otherwise damaging the film or other record medium.

This invention was evolved with the general object of overcoming such shortcomings and otherwise improving the construction and operation of flying spot scanning systems.

According to this invention, a hollow rotatable capstan is provided having a transparent cylindrical wall disposed between aligned face portions of transmission means disposed between a radiation source and a radiation detector, and a record medium is trained over the capstan to travel between the face portions with rotation of the capstan. With this arrangement, the record medium can be smoothly fed between the face portions to vary the transmission of radiation between such face portions in accordance with information on the record medium. Since there is no relative movement between the engaged surfaces of the capstan and the record medium, scratching or other damage to the record medium is obviated. This is particularly important where the record medium is of a type such as a film which can be readily damaged by scratching, and with this arrangement it is possible to handle damp film without scratching.

Another important advantage of the system of this invention is that the surface of the record medium can be precisely located relative to the adjacent line face of the transmission means, to permit close spacing and a high and uniform resolution.

According to a specific feature, the scanning is performed by the line face which is adjacent the outer surface of the capstan, against which the record medium is disposed. In the case of a film, the emulsion side is disposed outwardly to be as close as possible to the scanning face.

According to further features of the invention, fiber optic elements are used in defining the energy transmission paths from the radiation source to the radiation detector. With such elements, and with the transparent capstan element, it is possible to obtain very high resolution capabilities coupled with high scanning speeds.

One portion of the transmission means preferably comprises scanning means in the form of a circle-to-line shape transducer including fiber optic elements having ends disposed in a line to form one of the face portions and having opposite ends disposed in a circle, with a distributor rotatable on the axis of the circle and including a fiber optic element having one end on the circle axis and an opposite end movable adjacent the ends of the fiber optic elements which are arranged in the circle.

The other portion of the transmission means preferably comprises fiber optic elements having ends disposed in a line to form one of the face portions and having opposite ends crowded together to define a generally planar surface area of minimum dimensions. With this arrangement, optimum use may be made of a radiation detector such as a photo-multiplier tube having a sensitive face which is generally circular.

Another feature of the invention relates to the provision of a stationary fiber optic light pipe, preferably having a U-shaped configuration, with one end thereof adjacent the radiation source and an opposite end adjacent the end of the fiber optic element of the distributor which is disposed on the rotational axis. With this feature, the construction is simplified, a more compact assembly is provided, and a high efficiency is obtained.

This invention contemplates other objects, features and advantages, which will become more fully apparent from the following detailed description taken in conjunction with the accompanying drawing, in which the single figure is a schematic perspective view of a fiber optic scanning system constructed in accordance with the principles of this invention.

Referring to the drawing, reference numeral 10 generally designates a fiber optic scanning system constructed according to the invention. The system 10 is used to scan a record medium in the form of a film 11 and to produce an electrical signal corresponding to information thereon. The film 11 is passed from a supply spool, not shown, and about a portion of a capstan 12 to a take-up spool 14, a pair of idler rollers 15 and 16 being provided for holding the film 11 against the capstan 12.

The capstan 12 has a cylindrical wall 17 of a transparent material, preferably glass, to permit transmission of light between spaced elongated or line face portions 19 and 20 of means operative to transmit energy from a source 21, in the form of a lamp, to a detector 22, in the form of a photo-multiplier tube.

In the illustrated system, light is transmitted from the lamp 21 through a scanning means 24 to the face 19, thence through the film 11 and the wall 17 to the face 20, and thence to a light-sensitive face defining the lower end of the photo-multiplier tube 22. The scanning means 24 operates to concentrate or restrict the transmission to an incremental spot area which moves longitudinally of the face 19 (vertically in the illustrated system) to perform a transverse scan of the film 11.

As illustrated schematically, the scanning means 24 comprises a circle-to-line fiber optic transducer or converter 25 having a plurality of fiber optic elements, having ends disposed in a line to define the face 19 and having opposite ends defining a circular face 26. Thus one element 27, illustrated in enlarged form for clarification, has one end 28 defining a portion of the face 19, and an opposite end 29 defining a portion of the circular face 26.

A commutator device 30 is provided which comprises a generally U-shaped fiber optic element 31 having one end 32 on the axis of the circular face 26 and an opposite end 33 facing the circular face of the converter 25. The element 31 is carried in a block 34 carried by a shaft 35 of a scanning motor 36 which rotates the shaft 35 at a relatively high speed, the axis of the shaft 35 being coincident with the axis of the circular face 26.

According to an important feature of the invention, light is supplied to the end 32 of the device 31 from one end 37 of a generally U-shaped fiber optic light pipe device 38 having an opposite end 39 for receiving light from the lamp 21, through a pair of condensing lenses 40 and 41.

To transmit energy to the face of the photo-multiplier tube 22, a device 42 is provided, comprising a plurality of fiber optic elements having ends disposed in a line to define the face 20, and having opposite ends crowded together to form a planar end face of minimum dimensions adjacent the sensitive face of the photo-multiplier tube 22, one of such fiber optic elements 43 being shown schematically.

A motor 44 is provided for driving the capstan 12 and the take-up spool 14. The motor 44 has a shaft 45 which is mechanically coupled through a speed reduction gear train to a shaft 46 carrying a helical pinion 47 engaged with a helical gear 48 which carries the capstan 12. The speed reduction gear train comprises a pinion 48a meshed with a gear 49, coupled through a shaft 50 to a gear 51 meshed with a gear 52 which is coupled through a shaft 53 to a pinion 54 meshed with a gear 55 which is coupled through a shaft 56 to a pinion 57 meshed with a gear 58 on the shaft 46.

The motor shaft 45 at its opposite end carries a bevel gear 60 meshed with a bevel gear 61 which is coupled through a shaft 62 to a worm 63 meshed with a worm gear 64 which is coupled through a shaft 65 to a worm 66 meshed with a worm gear 67 which is coupled through a shaft 68 and a slip clutch 69 to the take-up spool 14.

The gearing ratios and the slip clutch 69 are such as to produce a predetermined tension on the film between the capstan 12 and the take-up spool 14.

It is noteworthy that since there is no relative movement between the engaged surface of the film 11 and the capstan 12, scratching or other damage to the film 11 is obviated, and it is possible to handle damp film without scratching, which is a very important advantage. The emulsion side of the film 11 is preferably disposed to face outwardly from the capstan 12, to be closely adjacent the line face 19 of the scanning system, thereby permitting a high and uniform resolution capability. The cylindrical wall 17, which is preferably of glass, is very accurately formed, to permit the desired close spacing. With the fiber optic scanning system, in combination with the film drive and support arrangement, it is possible to obtain high resolution at high speeds, with a very compact assembly.

It will be understood that modifications and variations may be effected without departing from the spirit and scope of the novel concepts of this invention.

I claim as my invention:

1. In a flying spot scanning system for transducing variations in radiation transmission characteristics of a record medium into varying electrical signals, radiation source means, radiation detector means, transmission means between said source and detector means including elongated face portions in spaced aligned relation for transmission of radiation from one face portion to the other, scanning means associated with said transmission means for restricting transmission between said face portions to an incremental spot area movable longitudinally with respect to said face portions, a hollow capstan rotatable about an axis generally parallel to said face portions and having a transparent cylindrical wall disposed between said face portions, and means for training a record medium over said capstan to travel between said face portions with rotation of said capstan.

2. In a flying spot scanning system for transducing variations in radiation transmission characteristics of a record medium into varying electrical signals, radiation source means, radiation detector means, transmission means between said source and detector means including elongated face portions in spaced aligned relation for transmission of radiation from one face portion to the other, scanning means associated with said transmission means for restricting transmission between said face portions to an incremental spot area movable longitudinally with respect to said face portions, a hollow capstan rotatable about an axis generally parallel to said face portions and having a transparent cylindrical wall disposed between said face portions, and means for training a record medium over said capstan to travel between said face portions with rotation of said capstan, said scanning means comprising a rotatable commutating fiber optic element, and a plurality of stationary fiber optic elements cooperating with said rotatable element to define paths from said radiation source means to said detector means.

3. In a flying spot scanning system for transducing variations in radiation transmission characteristics of a record medium into varying electrical signals, radiation source means, radiation detector means, transmission means between said source and detector means including elongated face portions in spaced aligned relation for transmission of radiation from one face portion to the other, scanning means associated with said transmission means for restricting transmission between said face portions to an incremental spot area movable longitudinally with respect to said face portions, a hollow capstan rotatable about an axis generally parallel to said face portions and having a transparent cylindrical wall disposed between said face portions, means for training a record medium over said capstan to travel between said face portions with rotation of said capstan, said scanning means comprising a circle-to-line shaped transducer including a plurality of fiber optic elements having ends disposed in a line to form one of said face portions and having opposite ends disposed in a circle, and a distributor rotatable on the axis of said circle and including a fiber optic element having one end substantially on said axis and an opposite end movable adjacent said opposite ends of said elements of said circle-to-line shape transducer.

4. In a flying spot scanning system for transducing variations in radiation transmission characteristics of a record medium into varying electrical signals, radiation source means, radiation detector means, transmission means between said source and detector means including elongated face portions in spaced aligned relation for transmission of radiation from one face portion to the other, scanning means associated with said transmission means for restricting transmission between said face portions to an incremental spot area movable longitudinally with respect to said face portions, a hollow capstan rotatable about an axis generally parallel to said face portions and having a transparent cylindrical wall disposed between said face portions, means for training a record medium over said capstan to travel between said face portions with rotation of said capstan, support means secured to one end of said hollow capstan, and means for rotating said support means, said detector means comprising a photocell having a sensing face facing toward the opposite end of said hollow capstan, and said transmission means comprising a stationary device having one end adjacent said sensing face and an opposite end extending within said hollow capstan for defining one of said elongated face portions.

5. In a flying spot scanning system for transducing variations in radiation transmission characteristics of a record medium into varying electrical signals, radiation source means, radiation detector means, transmission means between said source and detector means including elongated face portions in spaced aligned relation for transmission of radiation from one face portion to the other, scanning means associated with said transmission means for restricting transmission between said face portions to an incremental spot area movable longitudinally with respect to said face portions, a hollow capstan rotatable about an axis generally parallel to said face portions and having a transparent cylindrical wall disposed between said face portions, and means for training a record medium over said capstan to travel between said face portions with rotation of said capstan, said transmission means comprising a plurality of fiber optic elements having ends disposed in a line to form one of said face portions and having opposite ends crowded together to define a generally planar surface area of minimum dimensions.

6. In a scanning system as defined in claim 5, said radiation detector means comprising a photocell having a radiation sensitive face disposed adjacent said planar surface area.

7. In a flying spot scanning system for transducing variations in radiation transmission characteristics of a record medium into varying electrical signals, radiation source means, radiation detector means, transmission means between said source and detector means including first and second elongated face portions in spaced aligned relation for transmission of radiation from one face portion to the other, scanning means associated with said transmission means and said first elongated face portion thereof for restricting transmission between said face portions to an incremental spot area movable longitudinally with respect to said face portions, a hollow capstan rotatable about an axis generally parallel to said face portions and having a transparent cylindrical wall disposed between said face portions with the outer surface thereof adjacent said first face portion and the inner surface thereof adjacent said second face portion, and means for training a record medium over said outer surface of said capstan to travel between said face portions with rotation of said capstan, with a surface of said record medium being closely adjacent said first face portion to obtain maximum resolution.

8. In a flying spot scanning system as defined in claim 7, said record medium being in the form of a film having an emulsion surface disposed outwardly to travel past said first face portion.

9. A flying spot scanner for transducing variations in radiation transmission characteristics of a record medium into varying electrical signals comprising:
(a) a motor driven circular face commutator containing a first U-shaped fiber optic light pipe having one end on the axis of the circular face and the other end near the periphery of the circular face;
(b) a circle-to-line fiber optic converter incorporating a plurality of fiber optic elements having one set of ends disposed in a circle near the circular commutator's face adjacent to the peripheral end of the first U-shaped fiber optic light pipe and another set of ends disposed in a straight line to define a face;
(c) a second generally U-shaped fiber optic light pipe having one end within the circular ends of the circle-to-line converter fiber optic elements on the commutator axis adjacent to the end of the first U-shaped fiber optic light pipe and having another end located beyond the circle-to-line fiber optic converter;
(d) a lamp;
(e) means for directing radiation from the lamp onto the end of the second generally U-shaped fiber optic light pipe located beyond the circle-to-line fiber optic converter;
(f) a circular cylindrical transparent capstan journaled for rotation about its longitudinal axis having the outside transparent wall located adjacent to, but slightly separated from, the circle-to-line fiber optic converter straight-line face.
(g) a photo-multiplier tube;
(h) a plurality of fiber optic elements having one set of ends disposed in a straight line to define a face located within the capstan in alignment with the straight-line face of the circle-to-line converter and having opposite ends crowded together to form a planar end face of minimum dimensions adjacent to the sensitive face of the photo-multiplier tube.
(i) means for pulling the record medium around the capstan between the straight-line faces; and
(j) means for synchronizing the speed of the commutator, the capstan, and the pulling means.

References Cited

UNITED STATES PATENTS

| | | | |
|---|---|---|---|
| 3,167,612 | 1/1965 | Strickholm | 88—1 |
| 3,210,462 | 10/1965 | Trott | 178—7.1 |
| 3,249,692 | 5/1966 | Clay et al. | 178—6 |

RALPH G. NILSON, *Primary Examiner.*

M. ABRAMSON, *Assistant Examiner.*